United States Patent
Layton

(10) Patent No.: US 11,406,952 B2
(45) Date of Patent: Aug. 9, 2022

(54) PORTABLE CUSTOM COSMETIC PIGMENT DISPENSER

(71) Applicant: BoldHue, Inc., Aurora, CO (US)

(72) Inventor: Karin Layton, Aurora, CO (US)

(73) Assignee: BoldHue, Inc., Aurora, CO (US)

( * ) Notice: Subject to any disclaimer, the term of this patent is extended or adjusted under 35 U.S.C. 154(b) by 477 days.

(21) Appl. No.: 16/537,606

(22) Filed: Aug. 11, 2019

(65) Prior Publication Data

US 2020/0047140 A1 Feb. 13, 2020

Related U.S. Application Data

(60) Provisional application No. 62/717,874, filed on Aug. 12, 2018.

(51) Int. Cl.
| | | |
|---|---|---|
| *B01F 13/10* | (2006.01) | |
| *G06K 9/00* | (2022.01) | |
| *B01F 33/84* | (2022.01) | |
| *G06V 40/16* | (2022.01) | |
| *A45D 44/00* | (2006.01) | |
| *B01F 101/21* | (2022.01) | |

(52) U.S. Cl.
CPC .......... *B01F 33/848* (2022.01); *G06V 40/162* (2022.01); *A45D 2044/007* (2013.01); *B01F 2101/21* (2022.01)

(58) Field of Classification Search
CPC . B01F 33/848; B01F 2101/21; G06V 40/162; A45D 2044/007
See application file for complete search history.

(56) References Cited

U.S. PATENT DOCUMENTS

| | | | |
|---|---|---|---|
| 5,903,465 A | 5/1999 | Brown | |
| 6,177,093 B1 | 1/2001 | Lombardi et al. | |
| 6,510,366 B1 * | 1/2003 | Murray | B01F 33/8442 700/285 |
| 7,963,303 B2 * | 6/2011 | Saranow | G01G 23/3728 141/83 |
| 8,564,778 B1 | 10/2013 | Igarashi | |
| 8,588,963 B2 * | 11/2013 | Samain | B01F 33/8442 700/239 |
| 8,636,173 B2 * | 1/2014 | Bartholomew | B01F 33/844 222/1 |
| 8,666,540 B2 * | 3/2014 | Milhorn | B01F 29/20 700/239 |
| 8,688,268 B2 * | 4/2014 | Samain | B01F 33/8442 700/239 |
| 8,830,468 B2 | 9/2014 | Igarashi | |
| 8,977,389 B2 * | 3/2015 | Witchell | A45D 44/005 700/233 |
| 9,007,588 B1 | 4/2015 | Igarashi | |

(Continued)

*Primary Examiner* — Michael Collins
(74) *Attorney, Agent, or Firm* — Perkins Coie LLP

(57) ABSTRACT

A portable custom cosmetic pigment dispenser creates a cosmetic pigment mixture that closely matches a person's skin color. The device is constructed with an RGB sensor at one end that scans the skin and records it in the RGB color space. A processor converts the RGB information into a CYMK+W color space. In an embodiment, a user is presented with a sample of the color as determined by the processor, and has an opportunity to accept or modify the color. Specific quantities of colored pigment are selected based on the corresponding weightings in the CYMK+W space.

20 Claims, 6 Drawing Sheets

(56) References Cited

U.S. PATENT DOCUMENTS

| | | | |
|---|---|---|---|
| 9,205,283 B2 * | 12/2015 | Miklatzky | A61K 8/463 |
| 9,858,685 B2 | 1/2018 | Nichol et al. | |
| 11,076,683 B2 * | 8/2021 | Wiltord | G06F 3/0482 |
| 2006/0108247 A1 * | 5/2006 | Liechty | B65D 81/32 |
| | | | 206/385 |
| 2016/0082403 A1 | 4/2016 | Ounzar | |
| 2016/0107133 A1 * | 4/2016 | Sugino | G01N 21/25 |
| | | | 366/142 |

* cited by examiner

PORTABLE CUSTOM COSMETIC PIGMENT DISPENSER

CROSS-REFERENCE TO RELATED APPLICATIONS

This application claims the benefit of U.S. Provisional Application No. 62/717,874, filed on Aug. 12, 2018, the subject matter of which is incorporated herein by reference.

TECHNICAL FIELD

The present disclosure relates generally to cosmetics and cosmetic applicators, and more particularly to a portable custom cosmetic pigment dispenser.

BACKGROUND

There are a variety of cosmetics on the market formulated to match skin colors. Many cosmetic companies provide a vast array of cosmetics categories like foundation, concealers and highlighters in numerous pigment choices to try to accommodate those many skin colors.

The problems with the variety of manufactured cosmetic pigments is that it can never quite match a person's true skin color. Skin colors come in an innumerable variety. Ethnicity showcases a distinctive range of hues. A person's ancestral genomes can mix racial skin colors giving unique shades to that individual. Seasonal changes, exposure to the sun and skin pigment disorders can create a discoloration of skin colors over time. Even with the array of cosmetics and pigments to choose from, not every person's skin can have a cosmetic match that is truly adapted to their singular dermal coloration.

SUMMARY

The present disclosure, as briefly described, is a portable custom cosmetic pigment dispenser used to provide cosmetic pigmentation that will closely match a person's skin color. The device is constructed with an RGB sensor at one end that scans the skin and records it in the RGB color space. A processor converts the RGB information into a CYMK+W color space. In an embodiment, a user is presented with a sample of the color as determined by the processor, and has an opportunity to accept or modify the color. Specific quantities of colored pigment are selected based on the corresponding weightings in the CYMK+W space.

DETAILED DESCRIPTION OF EXAMPLE EMBODIMENTS

Figure 1:
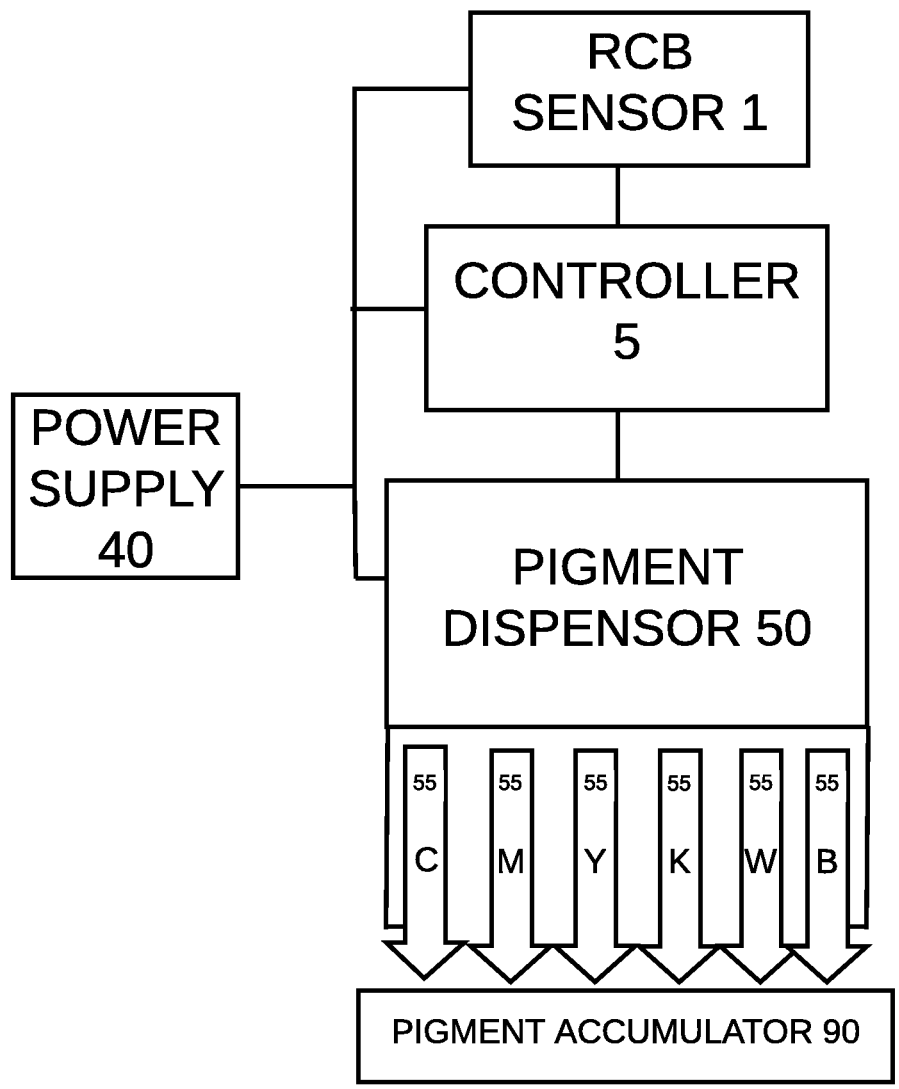
FIG. 1 shows an example block diagram illustrating the components of an example portable custom cosmetic pigment dispenser, according to an example embodiments of the disclosure

Referring to FIG. 1 a block diagram showing the components of an example portable custom cosmetic pigment dispenser 100, according to example embodiments of the disclosure, is illustrated. The block diagram includes an RGB (red, green and blue) sensor 1, a controller 5, a user interface 15, a pigment dispenser 50, a pigment accumulator 90, and a power supply 40. As will be described in greater detail, the portable custom cosmetic pigment dispenser 100 is a hand-held device that is used to determine a user's skin color using the RGB sensor 1, determine a mixture of colored cosmetic pigments that will closely match the user's skin color when mixed together, and dispense the individual colored cosmetic pigments into a pigment accumulator. The dispensed colored cosmetic pigments in the pigment accumulator will then be mixed together to arrive at a cosmetic that closely matches the user's skin color.

In operation, the user can interact with the device by utilizing the user interface 15. The user interface 15 can include an LCD display 11 for output and a plurality of input buttons 8-10 (as shown in FIG. 1), for example. However, the user interface 15 could alternatively, or additionally, include a variety of mechanical knobs, dials, and switches; a touchscreen; voice recognition, etc., to interface with the user. The user interface 15 is operatively connected to the controller 5, which in turn is operatively connected to the RGB sensor 1 and the pigment dispenser 50. In embodiments, when the user employs the custom cosmetic pigment dispenser 100, the user will be prompted (using the user interface 15) to place the top tip of the custom cosmetic pigment dispenser 100 adjacent the user's skin where the cosmetic is to be applied such that the RGB sensor 1 can scan the user's skin coloration. RGB sensors are known in the art, and typically will include an LED light or the like, an RGB color filter, and color sensing photodiodes. In general, a white light from the LED is displayed on an object, and the reflected light is passed through the RGB color filter such that red, green and blue colors are filtered. The color photodiodes convert the colored lights to current. This current, in the RGB color space, is a voltage measurement. Digital values for each of the colors (red, green, blue) can then be computed by an internal microprocessor (or the controller 5) and outputted. These values are usually six-digit hexadecimal (hex) values where digits 1-2 represent the intensity of red, digits 3-4 represent the intensity of green, and digits 5-6 represent the intensity of blue. Intensity is measured from decimal 0 (least) to 255 (or 00 hex to FF hex). As an example, the hex value A52A2A corresponds to a particular shade of brown. In this case, 'A5' (165) is the intensity of red, and '2A' (42) is the intensity of both green and blue in the mixture.

Continuing with FIG. 1, the controller 5 receives the outputted digital values from the RGB sensor 1, and converts the RGB values to a CMYK+W (cyan, magenta, yellow, black, and white) color scale for a more appropriate color. In this case, a value relating to an amount or percentage of each of the color components is computed such that when the colored pigments are mixed together the result will closely match the subject's true skin color. In general, the intensity value of the color component will reflect the weighting of the color component in the mixture. However, changes to the weighting formula can and will likely have to be made, particularly where colors need to be lightened or darkened. Color scale conversions can be achieved using an appropriate table lookup or a conversion formula. Conversions from an RGB scale to CMYK scale are known in the art and understood. However, these conversions typically are designed for printing applications with colored ink on a white paper background. As such, white or lighter colors are conventionally achieved by simply leaving some pixels without ink. Accordingly, the present disclosure provides for white pigment to be added to the mixture as appropriate. Additionally, other changes in color component weighting deviating from an existing table or formula can be made if desired so as to obtain a more realistic skin color. A percentage, ratio or amount of each of the pigment colors is thereupon determined. The controller 5 can include a microcontroller or programmable logic controller (PLC), for example. The controller 5 is capable of storing data and instructions in non-transitory memory, such as read-only memory (ROM) and/or programmable read-only memory (PROM). The controller 5 can be programmed in a variety of programming languages. If the controller 5 includes a standard microprocessor, languages such as C or C #can be used. If the controller 5 is a PLC, it can be programmed in a language adhering to the EC 61131-3 international standard for programmable controller programming languages.

Staying with FIG. 1 the calculated CMYK+W weightings can now be used to command the pigment dispenser 50 to dispense individual quantities of colored pigments stored in separate pigment reservoirs. However, before this is done, in an embodiment, the user is shown a sample of the color of the cosmetic that will be created. This can be done by displaying a color bar or the like of the color formulated based on the individual color weightings. The user can further be given the opportunity to approve the shown color, and only if approval is indicated, the controller 5 will instruct the pigment dispenser 50 to dispense the proper amounts of colored pigments. In some embodiments, the user is further provided with the ability to modify the color such as to lighten or darken it, or to adjust the hue. There are numerous ways in which the cosmetic pigment dispenser 50 can be realized. In general, the controller 5 can be electrically connected to each of the individual pigment color reservoirs 55 so that upon an "open" command or the like, a respective reservoir valve will be opened to dispense a determined quantity of colored pigment. The controller 5 can time the individual valve openings to remain open a length of time proportional to the respective weightings. For example, if a weighing for a first pigment color is 10% and a second pigment color 20%, the valve for the reservoir holding the second pigment color will stay open twice as long as the valve of the reservoir holding the first pigment color allowing twice the amount of the second pigment color to be dispensed than the first pigment color (assuming the rate of flow is the same). The valves can be closed upon issuance from the controller 5 of a "close" command or the like. The valve can be operated using a solenoid, for example. However, there are other ways to dispense the color pigments. As an alternative, the pigment could be "pushed" through a conduit using a pushing device (e.g., an actuator). In this case, the controller would command the pushing device to "start" and "finish" instead of "open" and "close". Depending on diameter size, the conduit could include a needle-type nozzle. If a solenoid is used, a micro-engineered solenoid can be provided. Once dispensed, the colored pigments are deposited into a pigment accumulator 90 that can be agitated and mixed together to create the matched skin color. This can be accomplished by shaking or stirring the device by hand or, in some embodiments, by way of a mechanical mixer, as examples.

Because the portable custom cosmetic pigment dispenser 100 makes use of various electronic components, the power source 40 is provided. The power source 40 preferably includes a rechargeable lithium-ion battery of sufficient voltage (but other types of batteries may suffice). Alternatively, or additionally, the custom cosmetic pigment dispenser 100 may operate using a wall plug. In this case, the power supply 40 would include an appropriate AC/DC converter.

Figure 2:
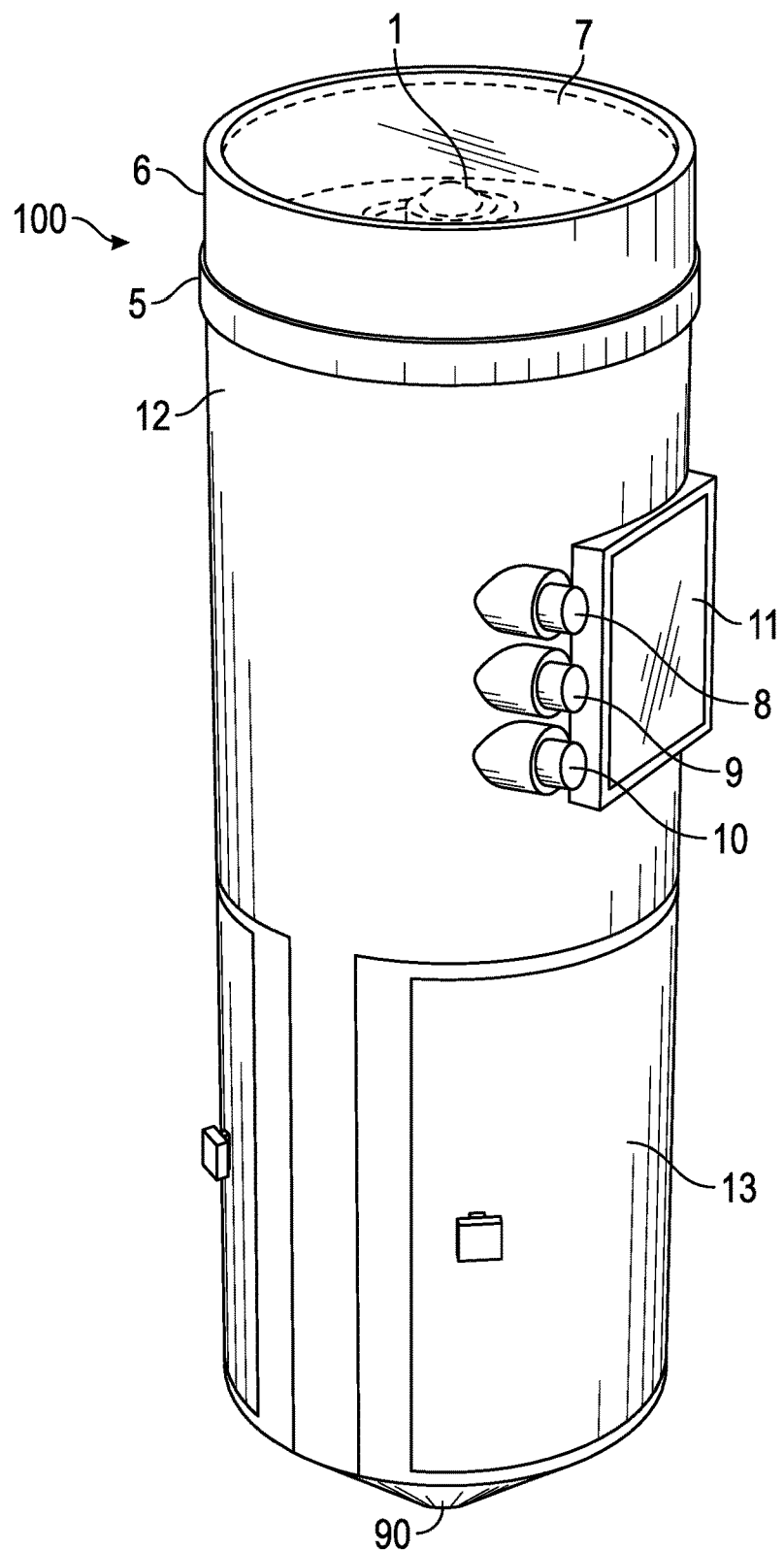
FIG. 2 shows a perspective view of an example portable custom cosmetic pigment dispenser, according to an example embodiment of the disclosure.

FIG. 2. Illustrates one example embodiment of the portable cosmetic pigment dispenser 100. Preferably, the portable cosmetic pigment dispenser 100 and its corresponding components are made of durable, corrosive-resistive materials such as metals, plastics, glass, or other known materials or composites. The shape, size and dimensions of the portable cosmetic pigment dispenser 100 can vary so long as hand-held portability is practical. The RGB sensor 1 is housed in a hollow body portion at a distal end 6 of the device 100. A clear or opaque cover 7 is disposed on one of the distal ends 6 of the portable custom cosmetic dispenser. The processor 5 can be disposed in a nearby area. The LED light from the RGB sensor 1 shines on the subject's skin and the intensity values for each of the red, green, and blue portions of the reflected light are calculated in the RGB sensor 1. The controller 5 is mounted just below the RGB sensor 1.

Continuing with FIG. 2, the lower main body 12 of the device 100 shows additional external features. A plurality of buttons 8, 9, and 10 are situated on the exterior of the lower main body 12 and are pushed to initiate the scanning and operational function of the device 100, as referred to the discussion relating to FIG. 1 supra. When the portable cosmetic pigment dispenser 100 is activated, a liquid crystal display (LCD) screen 11, also on the main lower body 12, will prompt the user on instructions to use the device 100. Once the device 100 is activated, the distal portion 6 is placed adjacent the skin and the scanning is performed. That data is collected in the RGB sensor 1 and passed to the controller 5 is converted into the CMYK+W color scale.

A plurality of access doors 13 are fastened in any known way to the lower main body 12 to allow admission to the inner mechanisms of the portable cosmetic pigment dispenser 100. This illustrated embodiment shows the portable cosmetic pigment dispenser 100 with the access doors 13 closed. At the bottom of the device 100, the pigment accumulator 90 will collect and allow for agitation of the CMYK+W after the calculated amounts are distributed from the syringe assembly of the pigment dispenser 50.

Figure 3:
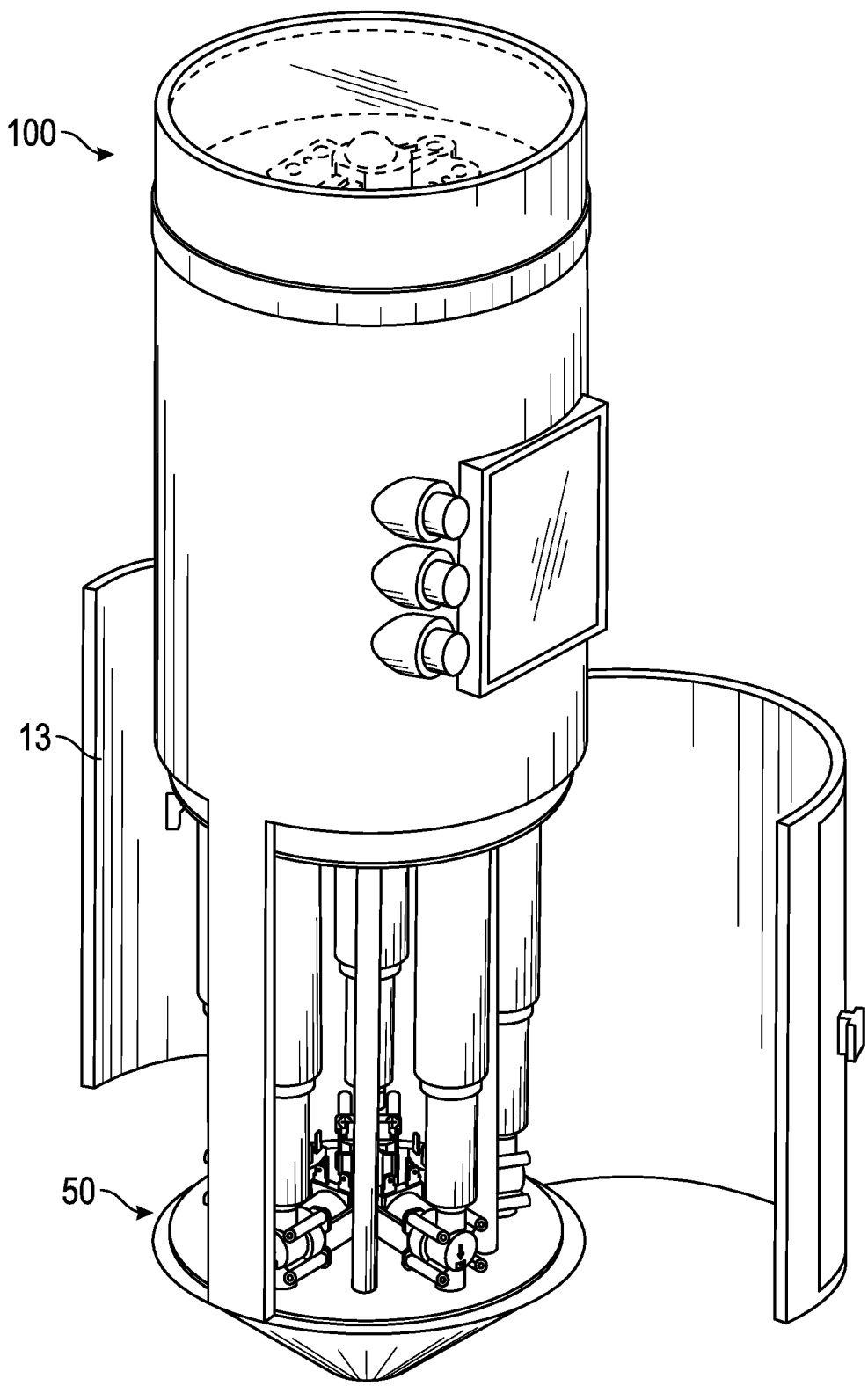
FIG. 3 shows a perspective view of the of the portable custom cosmetic pigment dispenser in a partially open state, according to an example embodiment of the disclosure.

FIG. 3 illustrates the completely assembled device 100 with the access doors 13 open to reveal the complete syringe assembly of the pigment dispenser 50.

Figure 4:
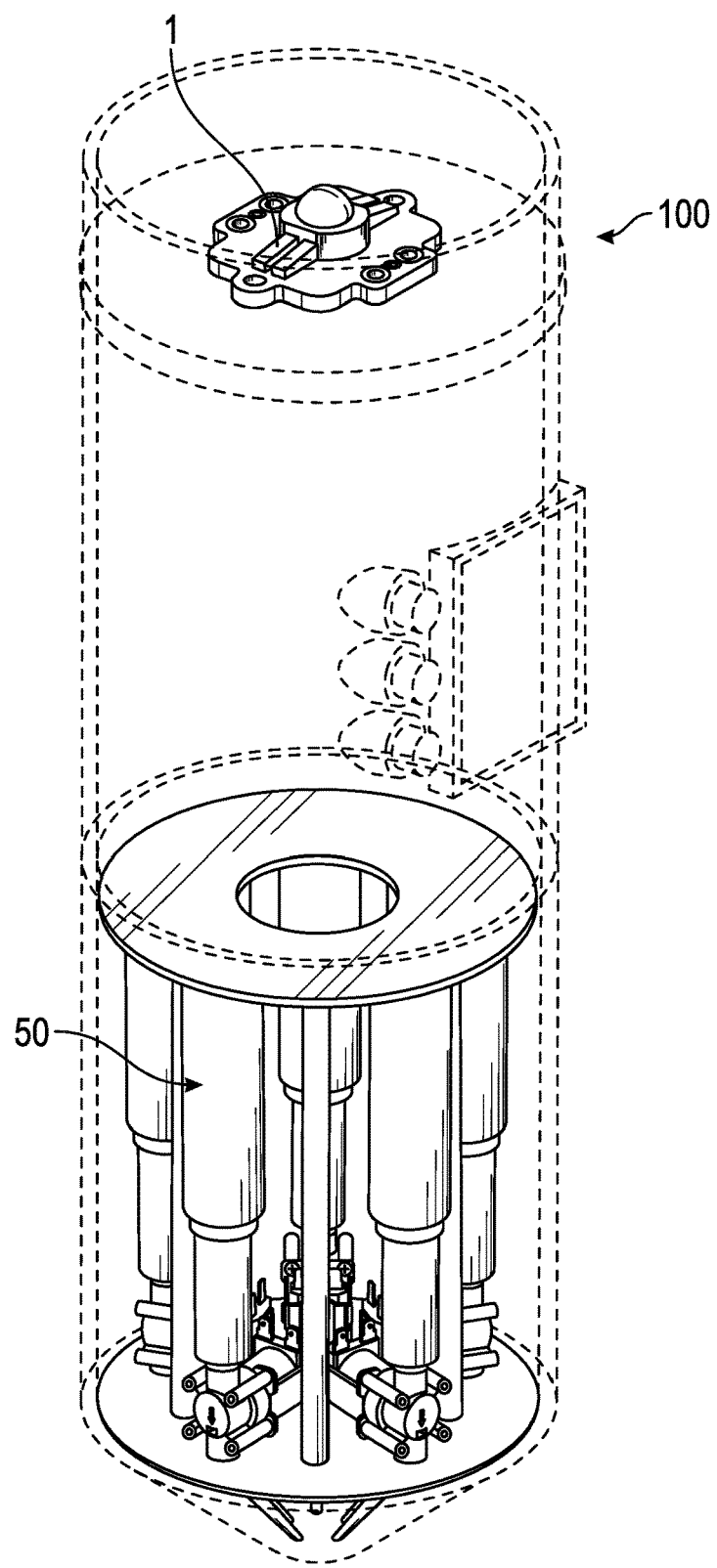
FIG. 4 shows a transparent perspective view of the portable custom cosmetic pigment dispenser, according to example embodiments of the disclosure.

FIG. 4. Illustrates a transparent view of the device 100 showing the placement of the RGB sensor 1 with the distal end portion 6. FIG. 4 also shows how the complete syringe assembly will rest within the lower main body 12 with the access doors 13 closed.

Figure 5:
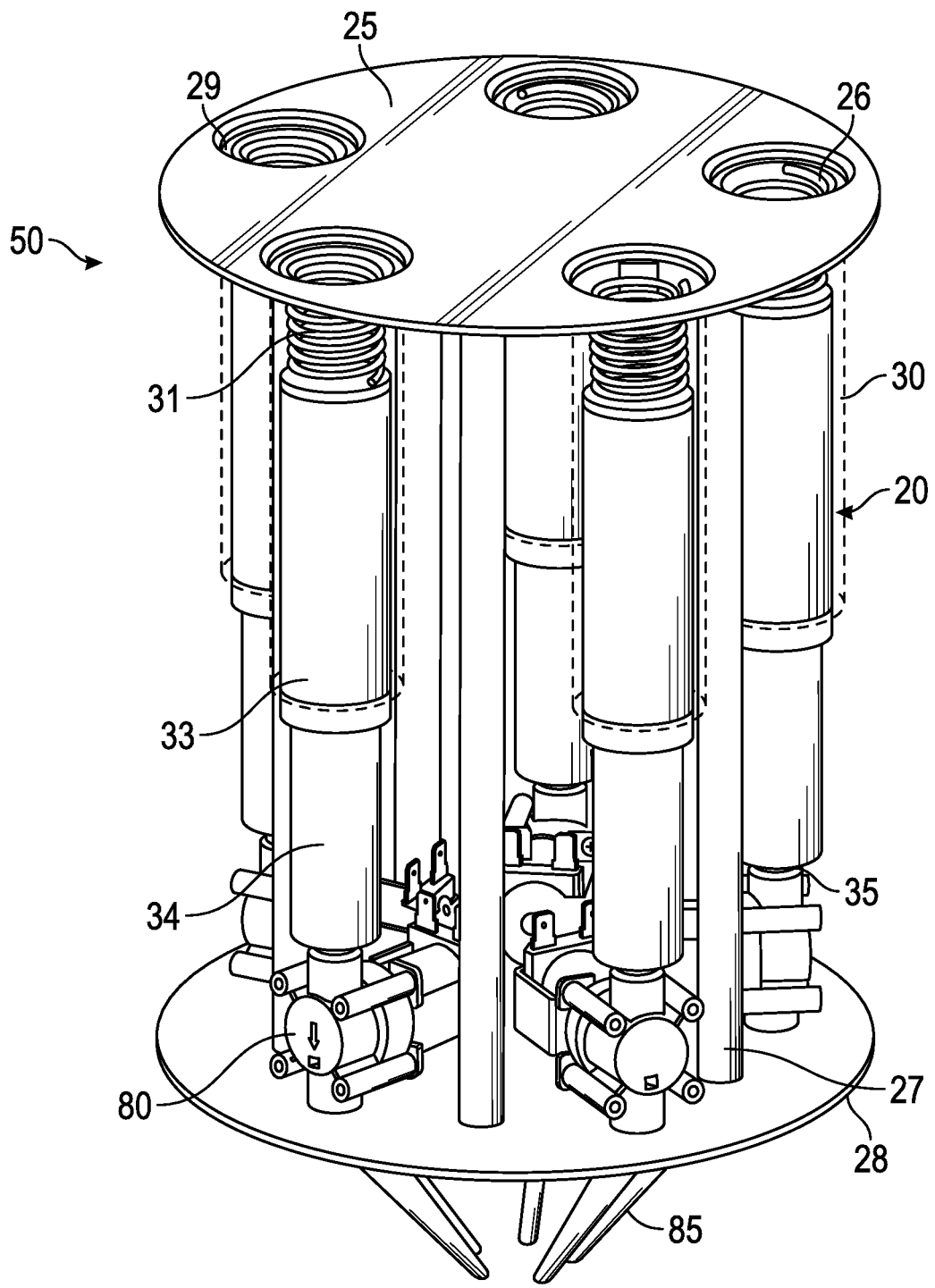
FIG. 5 shows a perspective view of the of a pigment dispenser assembly, according to example embodiments of the disclosure.

FIG. 5 illustrates a more detailed view of the pigment dispenser 50 which rests just below the hollow body distal end 6. The pigment dispenser 50 is made of a series multiple single syringe assembly pieces 20 that are the cosmetic reservoirs. The plurality of multiple single syringe assembly pieces 20 are held in a frame that has an upper portion 25 and lower portion 28 each with a plurality of holes 26 to secure a plurality of single syringe assemblies 20 at the syringes' 20 apex. The upper and lower portions of the frame 25 are secured to each other by a plurality of columns 27. FIG. 5 shows a solenoid valve 80 as a regulatory motor used to control the distribution of the colored pigments that are forced through the cosmetic distribution tip 35. Such solenoid valve 80 can be found on the market or custom made, and are known in the art, but other types of devices such as actuators or other motors can be used. The signal from the controller 5 will determine the amount of CYMK+W is needed to match the skin color of the individual scanned by the RGB sensor 1. In operation of solenoid valves 80, when a signal is sent by the processor 5 giving the mathematically calculated amounts of CYMK+W needed to make a skin color match, the solenoid valves 80 can regulate how much of each color to distribute. For colors that are needed, the solenoid valve can 80 determine the proper amount of pigment to dispense by various calculated means. The solenoid valve 80 can regulate the time the valve is open if a pre-determined amount can be sprayed per microsecond or other means of control. The valve can regulate the pigment distribution by a signal from the controller 5 and can work in conjunction with the plunger 33 commands. The plunger 33 and solenoid valve 80 can work in tandem to give a more accurate distribution of the calculated pigment amounts to match the scanned skin color.

A plurality of cosmetic collection channels 85 are attached to the bottom of each plurality of solenoid valves 80. The cosmetic collection channels can now move the measured cosmetics to the pigment accumulator 90, which can mix the measured CYMK+W for application to the skin.

Figure 6:
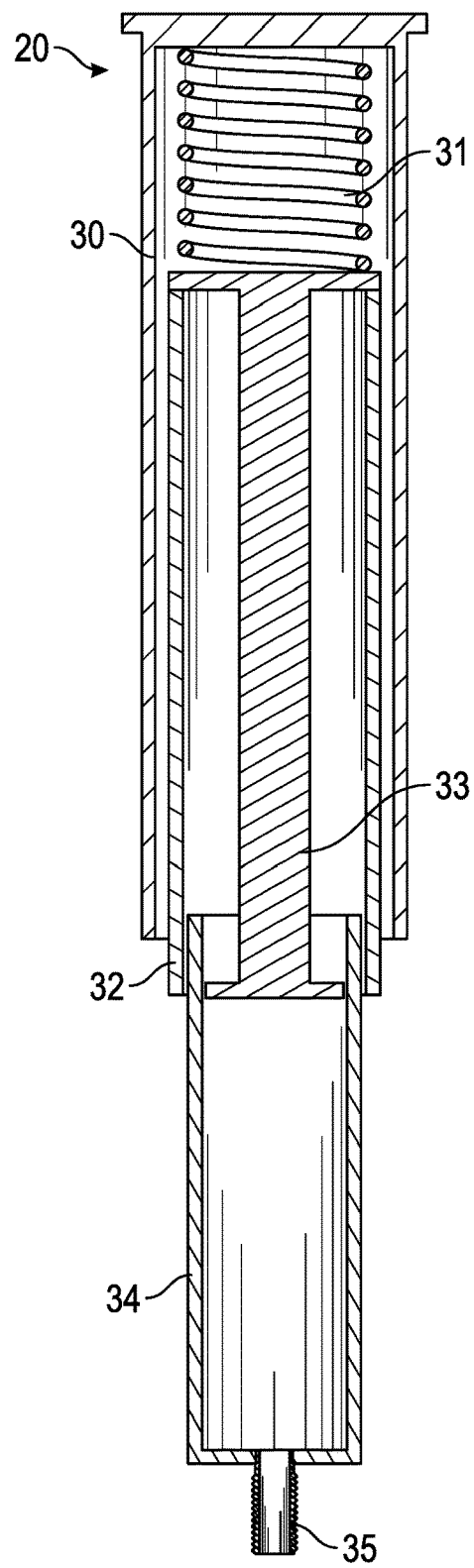
FIG. 6 shows a cross-sectional side view of a single syringe assembly, according to example embodiments of the disclosure.

FIG. 6 illustrates a cross-sectional view of the single syringe assembly piece 20 revealing multiple parts. A spring 31 is coiled and rests within the spring housing 30. The spring 31 maintains constant pressure on the plunger 33 apex. The plunger 33 rests in the plunger housing 32 with the bottom portion of the plunger 33 configured to the cosmetic housing 34. Once the signal for the controller 5 is sent to open the solenoid valve, the spring 31 uncoils and pushes the plunger 33 downwardly in the cosmetics housing. If a pigment is not needed then either no signal would be sent or a command to stay closed could be sent, or any other electronic message can be utilized to control how the plunger 33 can be controlled by the controller 5. As the plunger drops into the cosmetic housing 34, any one of the CYMK+W pigments that is in the cosmetic housing can now be forced through cosmetic distribution tip 35. The distribution tip 35 should be connected to a solenoid valve 80 that would be used to regulate the flow of cosmetic to be mixed after the initial scan. The connection between the tip 35 and valve 80 can be either locking, screwing, twisting or any other means of connecting the tubes 20 end into the solenoid 80 end.

Although the features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A portable custom cosmetic pigment dispensing device providing a customized cosmetic pigmentation sample, the portable custom cosmetic pigment dispensing device comprising:
 a red-green-blue (RGB) sensor component assembly configured to detect and filter RGB colors from a skin coloration of a user;
 a pigment reservoir that comprises a plurality of pigment reservoirs each configured to store a color selected from a group that comprises: cyan, magenta, yellow, black and white;
 a pigment accumulator that is connected with the pigment reservoir and configured to:
  receive a distribution of colors from one or more of the plurality of pigment reservoirs, and
  generate a mixture representative of the customized cosmetic pigmentation sample based on the distribution of colors received from the one or more of the plurality of pigment reservoirs; and
 a controller operatively connected with the RGB sensor component assembly, the pigment reservoir, the pigment accumulator and a memory, wherein the controller is configured to execute processing operations, from computer-executable instructions stored on the memory, that comprise:
  activating the RGB sensor component assembly,
  determining RGB color values indicating RGB colors for the skin coloration of the user,
  converting the RGB color values to cosmetic pigmentation values associated with a cyan, magenta, yellow, black and white (CMYK+W) color scale,
  providing at least one control command to the one or more of the plurality of pigment reservoirs configured to create the distribution of colors for the customized cosmetic pigmentation sample based on the cosmetic pigmentation values associated with the CMYK+W color scale, and
  generating the mixture representative of the customized cosmetic pigmentation sample.

2. The portable custom cosmetic pigment dispensing device of claim 1, wherein the sensor component assembly is housed in a hollow body portion of the portable custom cosmetic pigment dispensing device.

3. The portable custom cosmetic pigment dispensing device of claim 2, wherein the hollow body portion is detachable from a main body portion of the portable custom cosmetic pigment dispensing device enabling the hollow body portion to be movably positioned proximate to the user.

4. The portable custom cosmetic pigment dispensing device of claim 1, wherein the determining of the RGB color values comprises:
 determining a voltage measurement representative of the RGB colors from evaluation of the skin coloration of the user, and
 converting the voltage measurement to digital values, representative of the RGB color values, for each color of the RGB colors.

5. The portable custom cosmetic pigment dispensing device of claim 4, wherein the converting of the RGB color values to cosmetic pigmentation values comprises:
 determining, as the cosmetic pigmentation values, a quantity for one or more CMYK+W color values based on an evaluation of the digital values for each color of the RGB colors, and determining, based on the quantity of the one or more CMYK+W color values, an amount of time to open each of the one or more of the plurality of pigment reservoirs for dispensing.

6. The portable custom cosmetic pigment dispensing device of claim 5, wherein the determining of the quantity of the one or more CMYK+W color values further comprises:
applying a weighting algorithm, programmed into the memory, that modifies the one or more of the CMYK+W color values to generate the cosmetic pigmentation values, wherein the cosmetic pigmentation values comprise weighting values for the one or more of the CMYK+W color values.

7. The portable custom cosmetic pigment dispensing device of claim 6, wherein the amount of time to open each of the one or more of the plurality of pigment reservoirs is determined based on the weighting values for the one or more of the CMYK+W color values.

8. The portable custom cosmetic pigment dispensing device of claim 5, wherein the at least one control command comprises a command that instructs the pigment reservoir to open the one or more of the plurality of pigment reservoirs for the amount of time determined respectively for each of the one or more of the plurality of pigment reservoirs.

9. The portable custom cosmetic pigment dispensing device of claim 8, wherein the at least one control command comprises a second command that instructs the pigment reservoir to close the one or more of the plurality of pigment reservoirs after lapse of the amount of time determined respectively for each of the one or more of the plurality of pigment reservoirs.

10. The portable custom cosmetic pigment dispensing device of claim 9, wherein the controller controls opening and closing of the plurality of pigment reservoirs through an actuator, and wherein the actuator is one or more selected from a group that comprises: a pump, a valve, a motor, and a switch.

11. The portable custom cosmetic pigment dispensing device of claim 1, further comprising: an electronic display that is configured to display a graphical user interface programmed to output from execution, by the controller, of the computer-executable instructions stored on the memory.

12. The portable custom cosmetic pigment dispensing device of claim 11, wherein the controller is configured to execute processing operations, from computer-executable instructions stored on the memory, that comprise:
detecting launch of the portable custom cosmetic pigment dispensing device, and
providing a representation of the graphical user interface on the electronic display.

13. The portable custom cosmetic pigment dispensing device of claim 12, wherein the controller is configured to execute processing operations, from computer-executable instructions stored on the memory, that comprise: outputting, through the graphical user interface a request for the user to interact with the RGB sensor component assembly enabling detection of the skin coloration of the user, and wherein the outputting of the request, through the graphical user interface, occurs based on the activating of the RGB sensor component assembly.

14. The portable custom cosmetic pigment dispensing device of claim 13, wherein the request provides instructions, through the graphical user interface, that request that the user place an RGB sensor, of the RGB sensor component assembly, proximate to a skin portion of the user.

15. The portable custom cosmetic pigment dispensing device of claim 12, wherein the controller is configured to execute processing operations, from computer-executable instructions stored on the memory, that comprise:
outputting, before providing at least one control command to the one or more of the plurality of pigment reservoirs, a sample visualization of the customized cosmetic pigmentation sample, and
requesting a receipt of an approval of a correctness of the customized cosmetic pigmentation sample based on the sample visualization before providing the at least one control command to the one or more of the plurality of pigmentation reservoirs.

16. The portable custom cosmetic pigment dispensing device of claim 15, wherein the controller is configured to provide the at least one control command to the one or more of the plurality of pigment reservoirs based on the receipt of the approval of the correctness of the customized cosmetic pigmentation sample through the graphical user interface.

17. The portable custom cosmetic pigment dispensing device of claim 15, wherein the controller is configured to execute processing operations, from computer-executable instructions stored on the memory, that comprise: outputting an instruction, through the graphical user interface, indicating that the mixture, representative of the customized cosmetic pigmentation sample, is ready for use.

18. The portable custom cosmetic pigment dispensing device of claim 1, wherein the controller is configured to execute processing operations, from computer-executable instructions stored on the memory, that comprise: outputting, after the generating of the mixture representative of the customized cosmetic pigmentation sample, the mixture for user application.

19. The portable custom cosmetic pigment dispensing device of claim 11, wherein the controller is configured to execute processing operations, from computer-executable instructions stored on the memory, that comprise:
receiving, through the graphical user interface, a request to modify the customized cosmetic pigmentation sample by one of lightening or darkening the customized cosmetic pigmentation sample, and
in response to the receiving of the request to modify the customized cosmetic pigmentation sample, providing at least one control command to the one or more of the plurality of pigment reservoirs configured to modify the distribution of colors for the customized cosmetic pigmentation sample based on the cosmetic pigmentation values associated with the CMYK+W color scale and the request to modify the customized cosmetic pigmentation sample,
generating a modified mixture for the customized cosmetic pigmentation sample, and
outputting the modified mixture for user application.

20. The portable custom cosmetic pigment dispensing device of claim 1, further comprising: a power source, operatively connected with other components of the portable custom cosmetic pigment dispensing device, and wherein the power source is one or more selected from a group that comprises: a battery, a rechargeable battery and an alternating current (AC) power plug.

* * * * *